Patented Sept. 8, 1925.

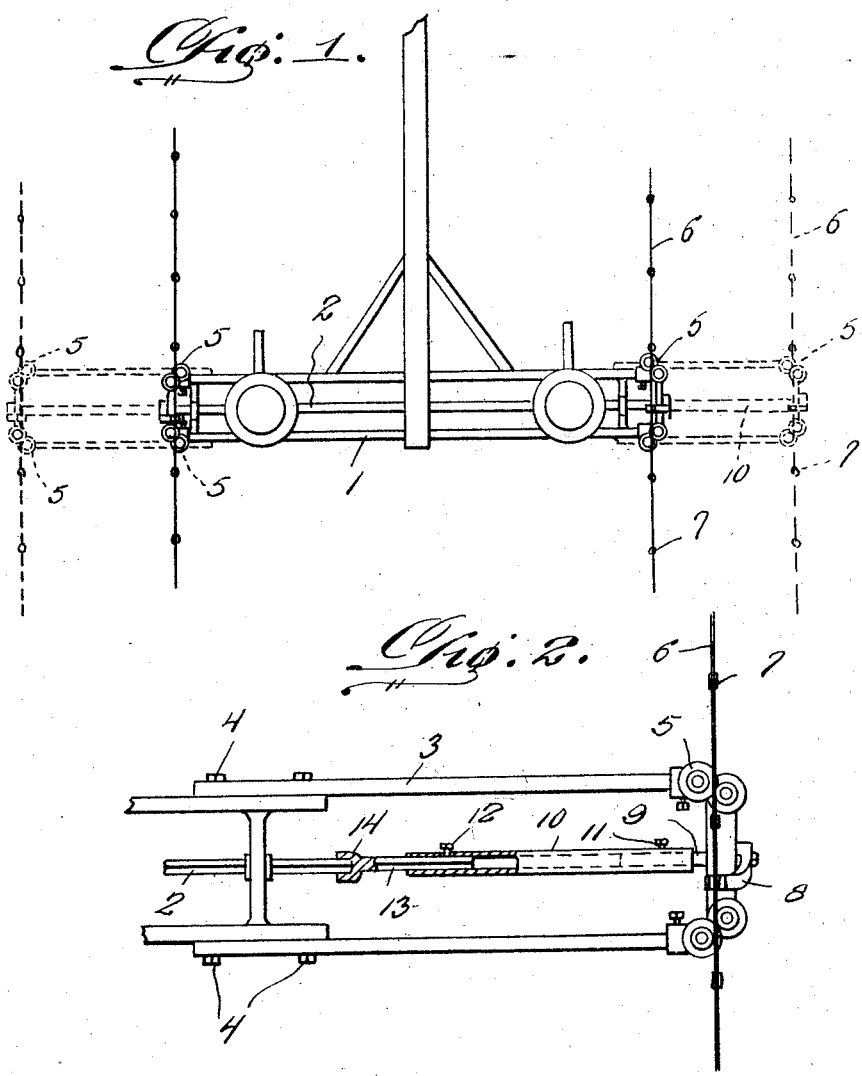

1,552,908

UNITED STATES PATENT OFFICE.

ALFRED J. BIRKY AND LOUIS W. BIRKY, OF MILFORD, NEBRASKA.

CHECKROW-PLANTER EXTENSION.

Application filed September 26, 1924. Serial No. 740,030.

*To all whom it may concern:*

Be it known that we, ALFRED J. BIRKY and LOUIS W. BIRKY, citizens of the United States, residing at Milford, in the county of Seward and State of Nebraska, have invented certain new and useful Improvements in a Checkrow-Planter Extension, of which the following is a specification.

This invention relates to extension devices especially adapted to be applied to check row planters and it consists in the novel features hereinafter described and claimed.

An object of the invention is to provide an extension attachment adapted to be applied to the frame of the planter whereby three or four draft animals may be used abreast for drawing the planter and thus contributing sufficient draft power so that the furrow openers of the planter may be operated in the soil at the same depth as that at which a lifter is used in the soil. An advantage gained by such a method of planting is that the seed is deposited deep in the soil and the crop may be worked in check row. In the conventional form of corn planter there is room for but two draft animals abreast and on account of the heavy pull, it is impossible to open the furrows to any great depth and get the corn down so that it will take a deep root. Two draft animals cannot pull the load. By the use of the attachment hereinafter described ample space is provided between the check row wire and the draft tongue of the planter to permit of the use of three or four draft animals and consequently ample power is provided for effecting the deep planting as hereinbefore referred to.

In the accompanying drawing:—

Figure 1 is a top plan view of a planter indicating in dotted lines the attachment applied thereto.

Figure 2 is a top plan view of the attachment with parts broken away and shown in section.

The planter to which the attachment is applied is indicated at 1 and is of conventional form. The planter includes the usual seed dropping operating shaft 2. The attachment comprises a frame 3 which is secured to the frame of the planter by means of bolts 4 and at the ends of the frame of the planter. The frame 3 is provided at its outer end with two pairs of upwardly disposed rollers 5 and the rollers of each pair receive between them the check row wires 6 in a usual manner. The wire 6 carries the usual spaced buttons 7. A fork 8 is mounted upon a shank 9 which is journaled in the outer end of the frame 3 and which is aligned with the shaft 2. A sleeve 10 receives the inner end of the shank 9 and is secured thereto by means of a set screw 11. The sleeve 10 is further provided at its inner end with a set screw 12 which engages frictionally against the side of the stub shaft 13 which is inserted in the inner end of the said sleeve. The stub shaft 13 is provided at its inner end with a socket head 14 which receives the outer end portion of the shaft 2.

When the frame 3 is applied to the frame of the planter it will be observed that the wire 6 is spaced for a considerable distance away from the tongue of the planter and consequently ample space is provided for increasing the number of draft animals used for drawing the planter. As the wire 6 passes between the rollers 5 and the buttons 7 come in contact with the fork 8, the said fork is swung whereby the shank 9, sleeve 10, stub shaft 13 and the shaft 2 are turned in a usual manner and the seed dropping mechanism of the planter is operated.

Having thus described the invention, what we claim is:—

A planter attachment including a frame adapted to be connected with the frame of a planter, a shank journaled in the outer end of the attachment frame, and adapted to be aligned with the feed dropping mechanism operating shaft of the planter, a fork carried by the shank, a sleeve adjustably mounted upon the shank, and a stub shaft adjustably secured in the sleeve and having a socket head adapted to engage the seed dropping operating shaft of the planter.

In testimony we have affixed our signatures.

ALFRED J. BIRKY.
LOUIS W. BIRKY.